United States Patent [19]

Miller et al.

[11] 4,032,665
[45] June 28, 1977

[54] SIMULATED BONE

[75] Inventors: Timothy Allen Miller, Ferguson, Mo.; Carlo J. Hansen, Waterloo, Ill.

[73] Assignee: Ralston Purina Company, St. Louis, Mo.

[22] Filed: May 15, 1975

[21] Appl. No.: 577,811

Related U.S. Application Data

[60] Division of Ser. No. 395,479, Sept. 10, 1973, which is a continuation-in-part of Ser. No. 174,569, Aug. 24, 1971, abandoned.

[52] U.S. Cl. .............................. 426/104; 426/496; 426/622; 426/656; 426/805
[51] Int. Cl.$^2$ ........................................ A23G 1/00
[58] Field of Search .......... 426/104, 805, 622, 656, 426/658, 496

[56] References Cited

UNITED STATES PATENTS

| | | | |
|---|---|---|---|
| 1,018,415 | 2/1912 | Ellis | 426/104 |
| 1,695,567 | 12/1928 | Weber | 426/104 |
| 3,567,459 | 3/1971 | Wruk et al. | 426/104 |
| 3,883,672 | 5/1975 | Bone et al. | 426/805 |

*Primary Examiner*—Raymond N. Jones
*Assistant Examiner*—C. A. Fan
*Attorney, Agent, or Firm*—W. Dennis Drehkoff

[57] ABSTRACT

A simulated bone of improved hardness and color is provided having as a structural matrix a white, unpuffed farinaceous mixture, in which the fat content of the matrix is controlled to below about 7% by weight, and the moisture content to between about 5 and 12% by weight thereby imparting a shear value to the matrix which is greater than 250 pounds.

3 Claims, No Drawings

SIMULATED BONE

BACKGROUND OF THE INVENTION

This application is a divisional application of our co-pending application Ser. No. 395,479 filed Sept. 10, 1973, which is a continuation-in-part application of our previous application U.S. Ser. No. 174,569 filed Aug. 24, 1971, now abandoned.

This invention generally relates to a simulated bone which is useful as a treat for pets.

It is well known that carnivorous animals such as dogs derive a great deal of satisfaction from the mastication of bones. Such mastication or chewing action by the pet is thought to provide needed jaw exercise for pets which are fed primarily on meal or canned food products requiring little chewing action. It is further believed that a secondary but desirable result of this chewing exercise is a cleaning action on the teeth of the canine because of fragmentation and abrasion by bone fragments against the teeth.

Natural bones, while highly advantageous for the above reasons suffer from a tendency to splinter rather than fragment uniformly thereby producing bone fragments with sharp, jagged edges that can be quite harmful to the animal. Furthermore, natural bones suffer from a nutritional deficiency because while they are a good source of calcium and phosphorous, they lack essential nutrients which are desirable for a pet to consume.

It would therefore be highly desirable to produce a pet treat resembling a natural bone but having improved nutritional properties with the strength to provide chewing exercise to the pet. It is also highly desirable to simulate a natural bone in color as well as hardness. In this regard, various attempts have been made to produce a simulated bone having desirable nutritional characteristics as well as the required hardness to permit chewing exercise for the pet. It is difficult, however, to achieve a balance between these two factors, when the materials which provide the most nutrition do not necessarily impart the desired structural characteristics to the bone to permit chewing exercise by the pet. U.S. Pat. No. 3,567,459, for example, describes a simulated bone which employs as the structural matrix a hot sugar melt wherein the sugar is molten under heated conditions, but thereafter sets up into a hard, brittle structure upon cooling, much like hard candy. With the sugar melt as the primary ingredient, a lesser proportion of starch or flour is included along with an undefined percentage of fat. The moisture content of the matrix is specifically essential to be less than 5% to attain the desired degree of hardness. The mixture of sugar, starch and fat are extruded with heat to place the sugar in a molten condition and thereby form a mixture of the other ingredients in the sugar melt. The mixture is then cooled to permit the sugar to form into a hardened condition with the other ingredients dispersed therein. The starch or flour is added at a level below 50% of the mixture since it is indicated that if greater than 50% starch is employed, a "puffed" low density product is the likely result which would lack sufficient hardness to resemble a bone. The described simulated bone, however, suffers from several deficiencies including a yellowish color because of browning of the sugars, especially when higher temperatures are employed in formation of the matrix, and a high degree of brittleness because of the use of a molten sugar matrix. The product is, therefore, susceptible to cracking upon use, thus lacking the appearance of a natural bone.

The present invention obviates these deficiencies of color and hardness by employing as the structural matrix for a simulated bone an unpuffed high density farinaceous material, without the presence of large amounts of sugar, having a critically defined percentage of fat and moisture to impart the desired degree of hardness to this type of matrix and simulate a natural bone in chewing behavior. The use of a starch structural matrix provides the bone with an improved whiteness, and permits the formation of a bone-like structure of having the desired degree of hardness without excessive brittleness and cracking.

SUMMARY OF THE INVENTION

The simulated bone of the instant invention therefore has a structural matrix consisting essentially of an unpuffed, high density farinaceous material that is naturally white in character produced by shaping of a farinaceous dough having a farinaceous ingredient in a percentage of between about 50 to 75% by weight, a fat content of between about 5 to 15% and a moisture content of 15 to 45% by weight. The dough is shaped under process conditions, in which puffing of the farinaceous material is specifically avoided to impart the desired texture and hardness to the simulated bone. Typically, this is carried out by extrusion of the dough at a temperature of between about 170° to 220° F., which together with critical control of moisture and fat within the described ranges yields an unpuffed farinaceous matrix desirble as the supporting structural matrix for a simulated bone.

As an alternative method of producing the farinaceous structural matrix of the instant invention, the dough is first passed through an extruder to more or less cook the farinaceous materials after which the extruded product is dried and then ground into a powder. The resultant powder is then mixed with a starch adhesive, such as dextrin having a DE of between 15 to 30, in an amount of 7 to 12% by weight of the mixture, after which the mixture is pressed into a structure having the shape of a bone, with the requisite degree of hardness and color.

The simulated bone or for the most part, the supporting structural matrix of the product, produced by either process consists essentially of an unpuffed highly dense farinaceous material said matrix having a moisture content by weight of between about 5 and 12%, a fat content of about 7% or less, said matrix having a shear value of not less than 250 pounds, and said bone having a color which falls within the following range as measured on a Gardner Color Difference Meter using a white color standard plate No. XL-10.

| White to Black | 70 to 90 |
| Red | −1.0 to 3.0 |
| Yellow | 15.0 to 30.0 |

The farinaceous material may include a portion of proteinaceous material such as vegetable protein isolate or meal so that the resultant bone has a protein content above 20%. This may be accomplished without adversely effecting the whiteness or texture of the bone. The bone may additionally include vitamins and minerals for nutritional balance. The use of a structural matrix which is composed substantially of a farinaceous material as contrasted to a sugar melt, provides a product of improved hardness and frangibility as well as whiteness.

It is, therefore, an object of the instant invention to provide a simulated bone which resembles a natural bone in hardness and color.

It is a further object to provide a structural matrix for the simulated bone which is composed substantially of an unpuffed, white farinaceous material having critically defined percentages of moisture and fat to yield the desired product characteristics of hardness and color.

DESCRIPTION OF THE PREFERRED EMBODIMENTS

The simulated bone of the instant invention is derived from a farinaceous mixture which has first been formed into a dough. The farinaceous mixture ultimately serves as the structural matrix for the product thereby providing the requisite degree of hardness and color for the simulated bone. As starting materials for formulation of the farinaceous dough, a suitable mixture of farinaceous materials are selected and mixed including lesser amounts of materials which would be characterized as proteinaceous. the farinaceous materials which are typically employed include those farinaceous materials which are naturally "white" in color and such as white corn, wheat flour, potato flour or flakes, rice flour or other substantially bleached flours or grains. These are formulated as part of the dough composition in an amount of between about 50 and 75% by weight of the dough. Alternatively, certain proteinaceous materials such as vegetable protein meals, typically soybean meal and the like may be added in amounts up to 25% of the dough to provide the structural matrix with a protein content above about 20% by weight, without adversely effecting the desired white color of the dough.

The particular farinaceous or proteinaceous material employed is not intended to be limiting in the instant invention with the exact material or mixture of materials employed being dependent on ingredient availability and palatability of the resultant product. The farinaceous mixture for the dough may also include certain vitamins and minerals needed to impart nutritional properties to the product and typical additives include, mineral sources such as bone meal, salt, and vitamin premixes. As an optional ingredient, a whitish pigment such as titanium dioxide or zinc oxide may be included to raise whiteness of the product to the indicated range, in the event the use of certain ingredients having a lesser degree of whiteness requires the addition of a pigment. A dough composition of the farinaceous souce is then formed by the addition of fat and moisture, to raise the level of fat and moisture in the dough to within a critically defined range and thereby providing the simulated bone, when formed, with a hardness or shear value about 250 pounds.

The dough composition will typically have a fat concentration of between about 5 and 15% by weight. The percentage of fat in the structural matrix also was unexpectedly found to be a critical factor in controlling the hardness of the simulated bone. In this regard, it was determined that if the structural matrix for the simulated bone had a fat content of about 7% by weight or less along with prescribed moisture content, the product had an acceptable shear value about 250 pounds and as a consequence an acceptable hardness. Higher fat levels in the final product considerably reduced the hardness of the bone and shear values were accordingly obtained which were below the desired level of 250 pounds.

The fat is mixed into the dough and although the particular type of fat employed is not intended to be limiting with animal or vegetable fats being suitable, nevertheless, animal fats such as tallow and the like are preferred because of their high palatability with domestic animals.

The moisture content of the dough is then adjusted to between about 15 to 45% by weight with a preferred moisture content of 25 to 35% by weight. This level of moisture in the dough will ordinarily provide the structural matrix of farinaceous material with a moisture content of between about 5 to 12% by weight. Control of the moisture level within this range was found to be critical for providing the desired shear characteristics of greater than 250 pounds. In this regard, it was determined that if the fat level of the matrix was held constant at say 5%, and the moisture content increased above 12%, the shear value was reduced to an unacceptable level below about 250 pounds. The product therefore becomes increasingly frangible at moisture levels below about 5% and for this reason moisture levels less than 5% in the structural matrix should be specifically avoided.

The formed dough composition may then be shaped or formed into the simulated bone by several alternative routes. One method as hereinafter described consists of extrusion of the dough composition into a "bone-like shape" under conditions of elevated temperature and pressure.

In this type of process the dough composition is fed into an extruder, with a rotating screw operated at a temperature of between about 170° to 240° F. wherein the dough is mixed and formed by passing through a restricted orifice into a shape resembling a bone. The minimum process temperature is of course enough to gelatinize or cook the starch without browning of the ingredients. Furthermore, control of the extrusion temperature to within the described range avoids puffing of the farinaceous material thereby reaching the hardness or shear value for the product.

Following extrusion, the simulated bone is dried to a moisture level of between about 5 and 12% by weight, with this moisture content being critical for the production of a simulated bone having a shear value above 250 pounds. Drying may be carried out in a forced air oven or similar apparatus, although temperatures lower than 250° F. should be employed to avoid the risk of browning or burning the ingredients thereby reducing whiteness of the product. Therefore, when the formed structural matrix has a moisture level between about 5 and 12%, and a fat level less than 7%, it has the desired degree of hardness to simulate a natural bone in chewing characteristics. In this regard, if a single bone produced in this manner is placed on a measuring device such as an Instron machine and a shear value recorded, it will generally be at least 250 pounds or higher.

An alternative procedure for the production of the simulated bone of the instant invention consists of taking the extruded or cooked farinaceous mixture, which has been dried to the desired moisture content of between about 5 to 12% and grinding the cooked farinaceous material. The farinaceous material is ground to a small enough size in order to pass through a screen with a 4/64 inch opening. The ground material is then mixed with a starch adhesive such as dextrin having a DE of between about 15–30, and formed into the shape of a bone. The dextrin adhesive insures consistent hardness of the product above the desired level of 250 pounds and permits reliable and consistent production of a simulated bone for a commercial operation.

The dextrin adhesive is preferably added in an amount of between about 7 to 12% by eight of the mixture, with a higher amount than this making the product too sticky to be desirable. After the dextrin is added, the ground mixture is conveyed to a steam preconditioning apparatus and the temperature controlled to between 180° to 250° F. and the moisture content controlled to between 9 and 11%. The product is immediately conveyed while heated into a suitable press and formed into the shape of the bone.

Without regard to either process of producing the simulated bone of the instant invention, the resultant product has a shear value or hardness greater than 250 pounds and by virture of the use of farinaceous materials as the matrix, a desirable whitish color with a whiteness as measured on a Gardner Color Difference Meter using a white color standard plate No. XL-10 of

| White to Black | 70.0 to 90.0 |
| Red to Green | −1.0 to 3.0 |
| Yellow to Blue | 15.0 to 30.0 |

The factor of whiteness is controlled by the choice of farinaceous materials as the primary ingredient of the structural matrix, and careful control of the temperature during formation of the matrix to avoid browning. The resultant hardness or shear value of the matrix of greater than 250 pounds is of course controlled by critically defined and disclosed ranges of moisture, fat and adhesive in the final product.

While the simulated bone can be in any of several shapes, the shapes which are most desirable include a round shape with a hollow center that can be filled with a nutritive mixture resembling marrow. The particular ingredients for the "marrow" center are not intended to be limiting and among those ingredients suitable for the marrow center are meat meal, corn gluten or wheat flour with added ingredients such as corn syrup, fat or humectants such as glycerine or propylene glycol to give the marrow a soft appearance.

The following Examples therefore are set forth as illustrative of the instant invention.

EXAMPLE 1

A simulated bone pursuant to the instant invention was produced by formulating a dough containing the following ingredients:

| Ingredient | % By Weight |
| --- | --- |
| Wheat Flour | 31 |
| White Corn | 27 |
| Soybean Meal (49% Protein) | 20 |
| Rice | 6 |
| Oat Meal | 5 |
| Steamed Bone Meal | 3 |
| Soybean Protein Isolate | 3 |
| Vitamin Premix | 1.5 |
| Mineral Premix | 0.5 |
| Tricalcium Phosphate | 1 |
| Fat | 1 |
| Titanium Dioxide | 0.1 |
| Salt | 0.25 |

The moisture content of the dough was adjusted to 30% by the addition of water, and agitated in a mixer until a uniform mixture was determined. The damp mass of the dough then was conveyed into an extruder operated at a temperature of 230° F. The dough was passed through a die into the atmosphere to produce a dense, unpuffed product. The resultant extrudate is then dried in a forced air oven at a temperature below 250° F., to a moisture content of 6–10% after which it is ground in a hammer mill.

The ground material is then mixed with 9% dextrin (15–30 DE) and fed into a steam conditioner heated at a temperature of 100° F. The moisture content of the mixture at this point is raised to about 10% and while heated conveyed to a press equipped with a die having the shape of a round bone with a hollow interior. The application of pressure forms the farinaceous structural matrix of the simulated bone of the instant invention having a white color and a hardness similar to that of a natural bone.

A marrow filling for the hollow interior of the bone was then formulated as follows.

| Ingredient | % By Weight |
| --- | --- |
| Glycerine | 21 |
| Propylene Glycol | 12 |
| Fat | 14 |
| Lecithin | 1 |
| Corn Syrup 63 DE | 2 |
| Monoblend No. 47 Brown Dye | .03 |
| Poultry Meal | 19.97 |
| Beef Meal | 5.0 |
| Corn Gluten | 20.0 |
| Wheat Flour | 5.0 | after which it was mixed until a soft, viscous mass was formed after which it was stuffed into the hollow interior of the farinaceous structural matrix to produce a simulated bone, having a white hard exterior but with a brownish soft interior resembling bone marrow.

EXAMPLE 2

A dough was formed with the ingredients of Example 1 by raising the moisture content to 30% after which the dough was fed into an extruder. The extruder was maintained at a temperature of 190° F. and the dough was subjected to the elevated temperature and pressure of the extruder after which it was passed through a die which consisted of a 2 inch pipe cap attached to a pipe 6 inches in length and having an inner diameter of 1½ inches. The pipe cap is used for mounting on the extruder. A ⅝ inch diameter rod was supported in the center of the pipe by two pins attached to the walls of the pipe and extending through the length of the pipe. Between the pins and the exit end of the die was a ring which took up half the open space between the pipe and the rod and rested on the rod. The ring was used to produce an even flow out of the exit end and thus compensate for the flow interruption of the support pins. The simulated bones produced from the die were essentially regularly shaped and round and had an inner diameter of 0.5 inches and an external diameter of 1.5 inches consisting of an unpuffed, white farinaceous mixture having a hardness and color similar to that of a natural bone.

EXAMPLE 3

This Example is designed to illustrate the effect of fat on hardness of the simulated round bone and compare the hardness with "Milk Bone" a commercially available dog treat type of product made by Nabisco Company. The simulated bones of this invention had a length of 0.56 inches a measured parallel to the "marrow hole". this was the axis upon which the bone was crushed for the Instron Shear measurement. The Milk Bone was crushed parallel to its shortest axis approximately midway along the length of the bone. The shortest axis measured 0.41 inches.

Three samples of simulated bones were prepared according to the procedure outlined in Example 2 with the fat level in the samples being the only variant. As the fat level was increased, the amount of wheat flour was decreased. The formula used for preparing the samples was as follows:

| | % Dry Weight Sample No. | | |
|---|---|---|---|
| Ingredient | 1 | 2 | 3 |
| Potato | 25 | | |
| Rice | 25 | | |
| Wheat Flour | 20 | 25 | 30 |
| Soybean Meal (solvent extracted 49% protein) | 10 | | |
| Sugar | 5 | | |
| Fat | 15 | 10 | 5 |

These samples were then dried to 10% moisture and subjected to a shear test on the Instron as well as the Milk Bone. Six runs were performed on each sample, and the values given below are the averages of those runs.

| Sample | Shear Pounds |
|---|---|
| 1. 15% fat | 60.5 |
| 2. 10% fat | 86.7 |
| 3. 5% fat | 370 |
| Milk bone | 49 |

As is indicated from the Example above, fat has a pronounced effect on the hardness of the bone. The two higher fat samples produce unacceptable shear values. As mentioned above and illustrated in the next Example, moisture levels also have a pronounced effect on shear values.

EXAMPLE 4

This Example illustrates the effect of final product moisture on shear.

Three samples were prepared using the 5% fat formula of Example 3 with each sample dried to a different moisture level. Each bone was crushed and shear measurements taken as before, and each sample had a length of 0.59 inches along the crushing axis. Moisture levels were determined by a Brabender Moisture Tester. The results of the shear test are given below.

| % Moisture | Shear Pounds |
|---|---|
| 13.8 | 137 |
| 10.0 | 298 |
| 7.0 | 422 |

Surprisingly, as the moisture level falls much below 7% the shear value decreases, and with continued drying the "bone" becomes increasingly frangible so that moisture levels below about 5% should be avoided.

EXAMPLE 5

This Example illustrates the effect on color of changes in formulations. Three lots of simulated bones were prepared according to the following formulas:

I

| Ingredient | % By Weight (dry) |
|---|---|
| Potato | 30 |
| Rice | 15 |
| Wheat Flour | 12 |
| Corn Gluten Meal (60% protein) | 15 |
| Soybean Meal (49% protein solvent extracted) | 15 |
| Sugar | 3 |
| Bone Meal | 2.5 |
| Fat | 7 |
| $TiO_2$ | 0.5 |

As above but with 3.0% bone meal and no $TiO_2$.

III

| Ingredient | % By Weight (dry) |
|---|---|
| White Corn | 25 |
| Wheat Flour | 25 |
| Pearled Barley | 17.25 |
| Soybean Meal | 15 |
| "Supro 610" | 6.0 |
| Bone Meal | 3.0 |
| Sugar | 2.0 |
| Vitamin & Mineral Premix | 1.75 |
| Fat | 5.0 |

"Supro 610" is a trademark of the Ralston Purina Company, St. Louis, Mo., for a commercially available soy protein isolate containing 95% soy proteins and is added, along with the other protein sources for nutritional reasons. The protein content of this formulation is about 20% of the finished product and this formula, with the added protein, provide adequate nutrition for regular feeding.

Each sample was tested for color as follows: First, 100 gm. of each sample was ground so that it passed through a 42 mesh screen. Then the Gardner Color Difference Meter was standardized using the White Color Standard No. XL-10 plate.

In measuring color on the Gardner meter a plate having known color values, here White No. XL-10 is used as standard. Each plate and every sample measured is calibrated along three color scales.

the first is the "L" scale, a white to black scale. The number value given for this scale is a % of absolute whiteness, hence the 91.7 value for the reference plate means the plate is substantially white. The $A_L$ scale is a red-green scale with higher numbers indicating increased "redness" and higher negative numbers increased "greenness". The $B_L$ scale is a yellow-blue scale with negative values possible also on this scale. High positive numbers on this scale indicate high levels of "yellowness" while high negative numbers mean that the sample has high levels of "blueness".

For testing a sample with unknown color parameters, the machine is allowed to warm up and then calibrated against a plate having known color values. The unknown is then compared with this color plate and the L, $A_L$ and $B_L$ values are all comparative values based on the particular plate chosen. Thus an L value of 84 for a sample means that it is 84% as white as the particular reference plate. Therefore, scale values without identification of, or scale values for the standard reference plate are meaningless. Sample preparation is also extremely important, otherwise, the data will not be reproducible.

In this Example, each sample was ground so that it passed through a No. 42 mesh screen. Each sample was then placed in an Optical Sample Beaker and tamped slightly so that the upper surface was ¼ inch from the top and parallel to the bottom of the beaker. Each sample was tested three times with the average of the tests reported below.

| Sample No. | L | AL | BL |
|---|---|---|---|
| XL-10 Plate | 91.7 | −1.1 | 0.5 |
| I | 84.5 | 0.0 | 26.4 |
| II | 81.3 | 1.0 | 27.6 |
| III | 89.8 | −0.7 | 17.2 |

The third sample was judged to be the most realistic with samples I and II being slightly more yellow than was deemed optimal. As would be expected, the pigmented sample produced a higher $_L$ value than the non-pigmented sample.

The above Examples are merely illustrative of the instant invention and it will be understood that various other changes in the details, materially of steps which have been described, may be made without departing from the spirit of the instant disclosure and such changes and other modifications are intended to be included within the scope of the instant disclosure and appended claims.

We claim:

1. A simulated bone containing 5–12% moisture and about 5% but less than 7% fat and having a structural matrix consisting essentially of a matrix of substantially unpuffed, farinaceous and proteinaceous ingredients, said simulated bone having been prepared by drying a dough composition containing 50–75% by weight farinaceous material, a proteinaceous material, 5–15% fat and 15–45% moisture, whereby the simulated bone has a shear value of not less than 250 pounds and a substantially white color which falls within the following range as measured on a Gardner Color Difference Meter using a White color standard Plate No. XL-10

| White to Black | 70 to 90 |
|---|---|
| Red | −1.0 to 3.0 |
| Yellow | 15.0 to 30.0 |

2. A simulated bone as set forth in claim 1 wherein said structural matrix includes a dextrin adhesive in an amount of between about 7 to 12% by weight of said matrix.

3. A simulated bone as set forth in claim 2 wherein said dextrin adhesive has a DE of between about 15 and 30.

* * * * *